United States Patent
Choi et al.

(10) Patent No.: US 11,549,631 B2
(45) Date of Patent: Jan. 10, 2023

(54) ASYMMETRICAL STRETCH COMPOSITE FOR PIPE LINER

(71) Applicant: Lydall, Inc., Manchester, CT (US)

(72) Inventors: Jin Young Choi, Blythewood, SC (US); John Lewis, Evans, GA (US)

(73) Assignee: Lydall, Inc., Manchester, CT (US)

( * ) Notice: Subject to any disclaimer, the term of this patent is extended or adjusted under 35 U.S.C. 154(b) by 724 days.

(21) Appl. No.: 16/208,948

(22) Filed: Dec. 4, 2018

(65) Prior Publication Data

US 2019/0211959 A1 Jul. 11, 2019

Related U.S. Application Data

(60) Provisional application No. 62/615,562, filed on Jan. 10, 2018.

(51) Int. Cl.
*F16L 55/165* (2006.01)
*B32B 5/02* (2006.01)
(Continued)

(52) U.S. Cl.
CPC .......... *F16L 55/1656* (2013.01); *B32B 5/022* (2013.01); *B32B 5/04* (2013.01); *B29C 63/0017* (2013.01); *B29C 63/34* (2013.01); *B29K 2105/105* (2013.01); *B29K 2105/106* (2013.01); *B29L 2023/006* (2013.01); *B32B 5/06* (2013.01); *B32B 5/12* (2013.01); *B32B 5/26* (2013.01); *B32B 27/12* (2013.01); *B32B 2250/20* (2013.01); *B32B 2260/023* (2013.01);
(Continued)

(58) Field of Classification Search
CPC ... F16L 55/1656; F16L 55/163; F16L 55/165; F16L 58/10; F16L 58/1009; F16L 58/1054; F16L 58/1063; B32B 5/022; B32B 5/04; B32B 5/028; B32B 5/12; B32B 2597/00; B32B 5/06–073; B32B 5/273; D04H 1/74
USPC .......................... 428/105–114; 442/366–369
See application file for complete search history.

(56) References Cited

U.S. PATENT DOCUMENTS 3,996,967 A * 12/1976 Takada .................... B29C 49/26
138/97
4,009,063 A * 2/1977 Wood ...................... B29C 53/36
156/71
(Continued)

FOREIGN PATENT DOCUMENTS

DE 3111473 A1 9/1982

OTHER PUBLICATIONS

Fangueiro R.. (2011). Fibrous and Composite Materials for Civil Engineering Applications—2.4.1.2 Multifilament Yarns. Woodhead Publishing. Retrieved from https://app.knovel.com/hotlink/pdf/id:kt00U03MM7/fibrous-composite-materials/multifilament-yarns (Year: 2011).*

(Continued)

*Primary Examiner* — Larissa Rowe Emrich
(74) *Attorney, Agent, or Firm* — Crowell & Moring LLP (57) ABSTRACT

A fibrous material or composite including a plurality of layers joined to one another, for example, by needlepunching, is disclosed. The fibrous composite generally has an asymmetrical stretch profile, such that the fibrous composite is more extensible in the cross-machine direction than in the machine direction. The fibrous composite may find particular use in forming a cure-in-place pipe liner.

18 Claims, 4 Drawing Sheets

(51) Int. Cl.
  *B32B 5/04* (2006.01)
  *B32B 27/12* (2006.01)
  *B32B 5/26* (2006.01)
  *B32B 5/06* (2006.01)
  *B32B 5/12* (2006.01)
  *B29L 23/00* (2006.01)
  *B29K 105/10* (2006.01)
  *B29C 63/00* (2006.01)
  *B29C 63/34* (2006.01)
  *F16L 58/10* (2006.01)

(52) U.S. Cl.
  CPC ............... *B32B 2262/0246* (2013.01); *B32B 2262/0253* (2013.01); *B32B 2262/0276* (2013.01); *B32B 2307/51* (2013.01); *B32B 2597/00* (2013.01); *F16L 58/1009* (2013.01)

(56) References Cited

U.S. PATENT DOCUMENTS

| | | | |
|---|---|---|---|
| 4,296,163 A | 10/1981 | Emi et al. | |
| 4,390,574 A * | 6/1983 | Wood | D04H 1/4218 428/212 |
| 4,684,556 A * | 8/1987 | Ohtsuga | D03D 3/02 428/36.1 |
| 5,221,587 A | 6/1993 | Böhnstedt et al. | |
| 5,334,446 A * | 8/1994 | Quantrille | B32B 7/12 442/35 |
| 5,431,991 A * | 7/1995 | Quantrille | D04H 3/045 428/109 |
| 5,501,248 A | 3/1996 | Kiest, Jr. | |
| 5,868,169 A * | 2/1999 | Catallo | F16L 58/02 138/124 |
| 6,242,127 B1 | 6/2001 | Paik et al. | |
| 6,360,780 B1 * | 3/2002 | Adolphs | F16L 55/1656 138/130 |
| 6,503,855 B1 | 1/2003 | Menzies et al. | |
| 6,732,763 B2 | 5/2004 | Williamson et al. | |
| 7,651,653 B2 | 1/2010 | Morman et al. | |
| 8,118,063 B2 * | 2/2012 | Kiest, Jr. | F16L 55/18 138/98 |
| 8,232,006 B2 | 7/2012 | Lam et al. | |
| 8,590,575 B2 | 11/2013 | D'Hulster | |
| 8,722,231 B2 | 5/2014 | Brilmyer et al. | |
| 9,052,053 B2 * | 6/2015 | Kiest | F16L 55/1651 |
| 9,074,718 B2 | 7/2015 | Kiest, Jr. | |
| 2003/0181111 A1 * | 9/2003 | De Meyer | B32B 25/10 442/59 |
| 2003/0217777 A1 * | 11/2003 | Williamson | F16L 55/1656 138/98 |
| 2005/0148250 A1 | 7/2005 | O'Connor et al. | |
| 2006/0292945 A1 | 12/2006 | Kuhn et al. | |
| 2007/0141303 A1 | 6/2007 | Steindorf | |
| 2009/0068419 A1 | 3/2009 | Pascavage | |
| 2009/0068420 A1 | 3/2009 | Pascavage | |
| 2010/0203362 A1 | 8/2010 | Lam et al. | |
| 2011/0174410 A1 * | 7/2011 | Li | F16L 11/085 138/141 |
| 2011/0318629 A1 | 12/2011 | Ho et al. | |
| 2012/0175004 A1 * | 7/2012 | Kiest, Jr. | F16L 55/179 138/98 |
| 2013/0081732 A1 * | 4/2013 | Kiest, Jr. | F16L 55/1651 138/98 |
| 2015/0200424 A1 | 7/2015 | Ogasawara et al. | |
| 2017/0077479 A1 | 3/2017 | Miller et al. | |
| 2017/0082220 A1 * | 3/2017 | Free | F16L 55/1651 |
| 2017/0288277 A1 | 10/2017 | Whear et al. | |
| 2018/0047964 A1 | 2/2018 | Natesh et al. | |
| 2018/0047990 A1 | 2/2018 | O'Keeffe et al. | |

OTHER PUBLICATIONS

"Yarn." Complete Textile Glossary. New York, NY: Celanese Acetate, 2001. N. pag. Print. (Year: 2001).*

Battery Vitamin, How is the Nanobarrier Formed?, Jun. 22, 2009, 11 pgs., http://www.batteryvitamin.net/how_is_the_nanobarrier_formed.

Daramic Technical Bulletin, Topic: Golf Car Battery Separators, Aug. 9, 2017, 3 pgs., https://www.daramic.com/storage/wysiwyg/Golf%20Car%20Separators%20comp.pdf.

Precision Pipe Solutions, Pipe Lining Process: Cured-IN-Place-Pipe Lining, Jul. 5, 2017, 2 pgs., http://precisionpipesolutions.net/pipe-lining-services-richmond.html.

* cited by examiner

ASYMMETRICAL STRETCH COMPOSITE FOR PIPE LINER

CROSS-REFERENCE TO RELATED APPLICATIONS

This application claims the benefit of U.S. Provisional Application No. 62/615,562 filed Jan. 10, 2018, which is incorporated herein by reference in its entirety.

FIELD OF THE DISCLOSURE

Various fibrous composites having an asymmetrical stretch profile in the machine direction and cross-machine direction are disclosed. Such materials may be particularly useful for forming cure-in-place pipe liners.

BACKGROUND OF THE DISCLOSURE

It is known that pipelines may degrade structurally over time. Due to the difficulty of digging up and replacing pipelines, various techniques have been used to line the interior of the pipes in situ. Most commonly, a flexible liner material or sleeve is inserted into the pipe and expanded radially. A curable resin applied to (or impregnated into) the pipe liner material bonds the expanded liner to the interior surface of the pipe to form a hardened internal pipe liner.

Unfortunately, when typical liners are expanded radially as described above, the liner also tends to expand in the lengthwise or axial direction, thereby making it difficult to cut the liner to the appropriate length before inserting it into the pipe. Therefore, there is a need for a pipe liner that expands radially but resists stretching in the axial direction. There is further a need for a material suitable for use in forming such a pipe liner.

BRIEF DESCRIPTION OF THE EXEMPLARY EMBODIMENTS

The present disclosure is directed generally to a fibrous material or composite including a plurality of layers joined to one another, for example, by needlepunching, to form a unitary structure. The fibrous composite may be generally characterized as having an asymmetrical stretch profile. More particularly, the fibrous composite may be extensible in the cross-machine direction and substantially inextensible (i.e., may have little or no extensibility) in the machine direction, such that a ratio of the CD to MD percent elongation for the composite may be at least about 3:1, and in some embodiments, at least about 4:1, at least about 5:1, or greater, where percent elongation is measured using ASTM D5035-11 (2015) using a 10 lb (10 #) or 50 lb (50 #) load (lb-f/2-in. strip), as indicated herein throughout.

In some embodiments, the CD-extensibility may be achieved using filament yarns extending along only the machine direction MD of the composite. In other embodiments, the CD-extensibility may be attained using a scrim having cross-directional extensibility. Still other possibilities are contemplated.

The fibrous composite may be used in a wide variety of applications, including, but not limited to, cure-in-place pipe liners (sometimes referred to as sleeves). In such an application, the composite may be generally formed into a tubular shape with the machine direction of the composite extending along the axial or lengthwise direction of the pipe liner. The resulting pipe liner has an asymmetrical stretch profile, with the pipe liner being more extensible in the radial or circumferential direction than in the lengthwise or axial direction. This allows for the liner to be cut more accurately and fit into place, as compared with liners that are prone to unwanted shrinking or extension in the lengthwise or axial direction.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which.

Various features, aspects, and advantages of the embodiments will become more apparent from the following detailed description, along with the accompanying figures in which like numerals represent like components throughout the figures and text. The various described features are not necessarily drawn to scale but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

For purposes of illustrating features of the embodiments, various examples will now be introduced and referenced throughout the disclosure. Those skilled in the art will recognize that these examples are illustrative and not limiting and are, provided purely for explanatory purposes.

FIGS. 1A-1B and FIGS. 2A-2B schematically illustrate exemplary fibrous (i.e., fiber-based) composites 100, 200 that may be suitable for use, for example, in forming a pipe liner. The composites 100, 200 have an asymmetrical stretch profile, such that the composites 100, 200 are more extensible in one direction than in the other, as will be discussed below.

Generally described, the composites 100, 200 each include a plurality of layers. Each layer has a first dimension (e.g., length) L extending in a first direction (e.g., a machine direction or warp direction) MD, a second dimension (e.g., width) W extending in a second direction (e.g., a cross-machine direction or weft direction) CD substantially perpendicular to the first direction MD, and a third dimension (e.g., a thickness) (not individually labeled) extending in a third direction Z. The plurality of layers collectively define a sheet-like structure likewise having a first dimension (e.g., length) L extending in the first direction (e.g., machine direction) MD, a second dimension (e.g., width) W extending in the second direction (e.g., a cross-machine direction) CD, and a third dimension (e.g., a thickness) T extending in a third direction Z. The first dimension L and the second dimension W of each layer may generally be coextensive with the first dimension L and the second dimension W of each other layer of the composite 100, 200, and the first dimension L and the second dimension W of the overall composite. The thickness T of the composite 100, 200 may generally be the sum of thicknesses of each individual layer (i.e., such that the thickness of each layer is a portion of the thickness T of the composite 100, 200).

Figure 1A:
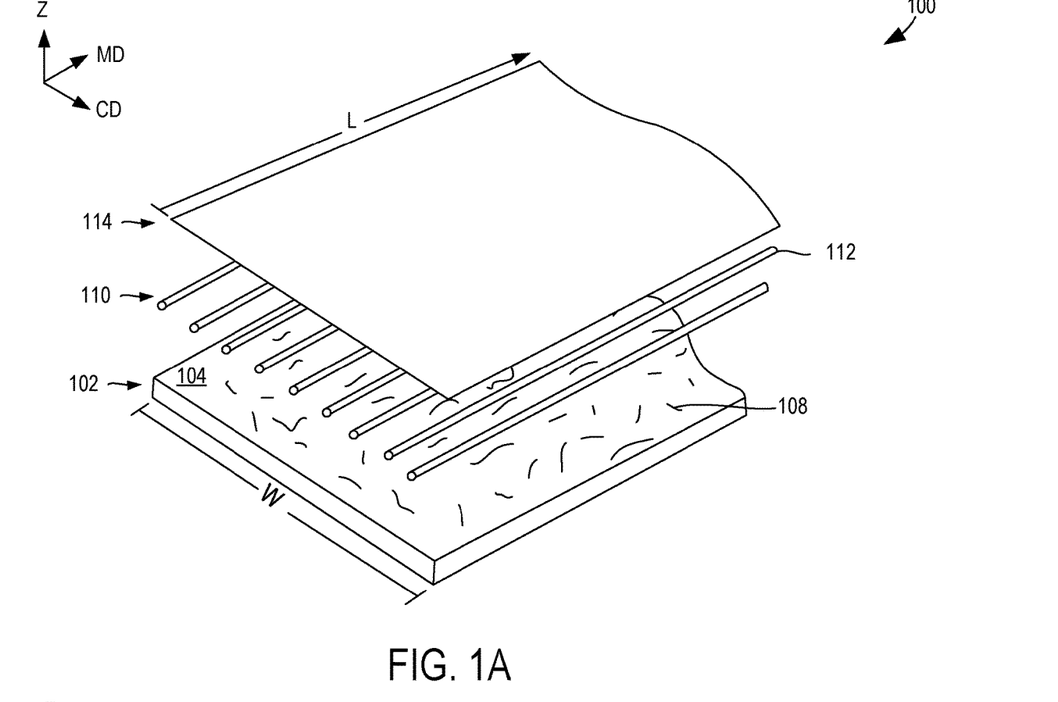
FIG. 1A is a schematic, exploded perspective view of an exemplary fibrous composite according to an embodiment.
Figure 1B:
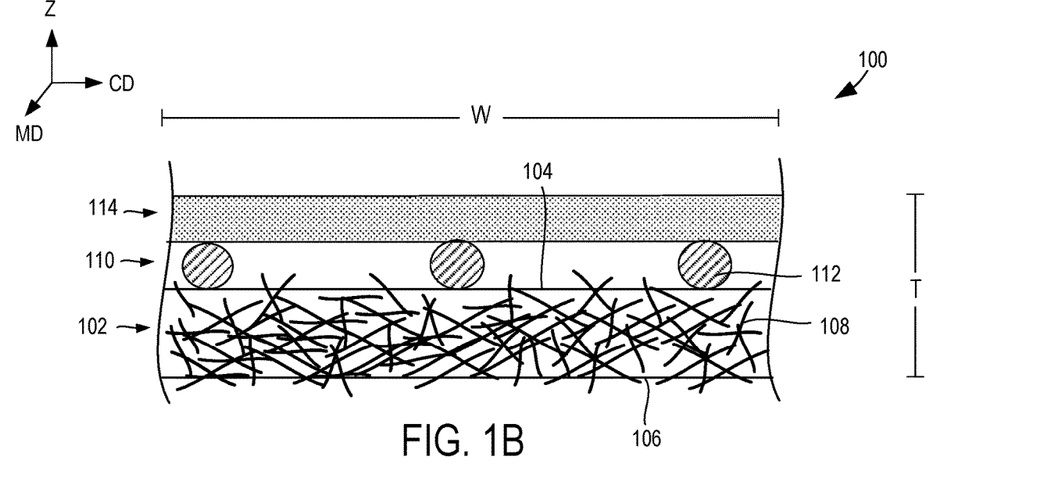
FIG. 1B is a schematic, cross-sectional view of the exemplary fibrous composite of FIG. 1A.

In the exemplary embodiment of FIGS. 1A and 1B, the composite 100 generally includes a carded web layer 102 (i.e., a layer of carded fibers) having a pair of opposed sides or surfaces 104, 106 (e.g., a first, inner side or surface 104 and a second, outer side or surface 106). The carded web layer 102 may generally be formed from (i.e., may generally comprise) staple fibers 108. The composite 100 may further include a layer 110 of (i.e., a plurality of) filament yarns 112 (i.e., a filament yarn layer 110) (e.g., plain, non-textured filament yarns) extending in the machine direction MD along the first surface 104 of the carded web 102. As used herein, a filament yarn refers to a plurality of filaments twisted or otherwise entangled together. It will be noted that the individual filament yarns 112 may be spaced apart from adjacent filament yarns along a width W of the carded web 102. Thus, although the filament yarns do not form a continuous or unitary layer, the term "layer" is used for simplicity and ease of discussion, and not limitation. It will further be appreciated that while carded web layer 102 is referred to as a single layer, the carded web layer 102 may include two or more plies of carded web.

Figure 2A:
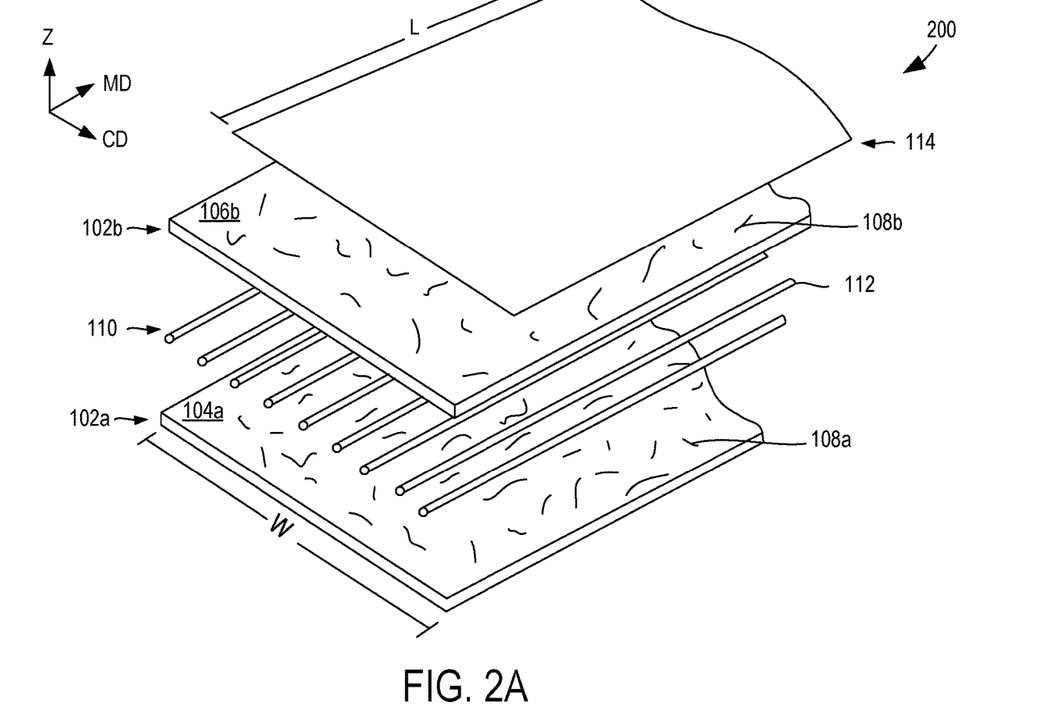
FIG. 2A is a schematic, exploded perspective view of another exemplary fibrous composite according to an embodiment.
Figure 2B:
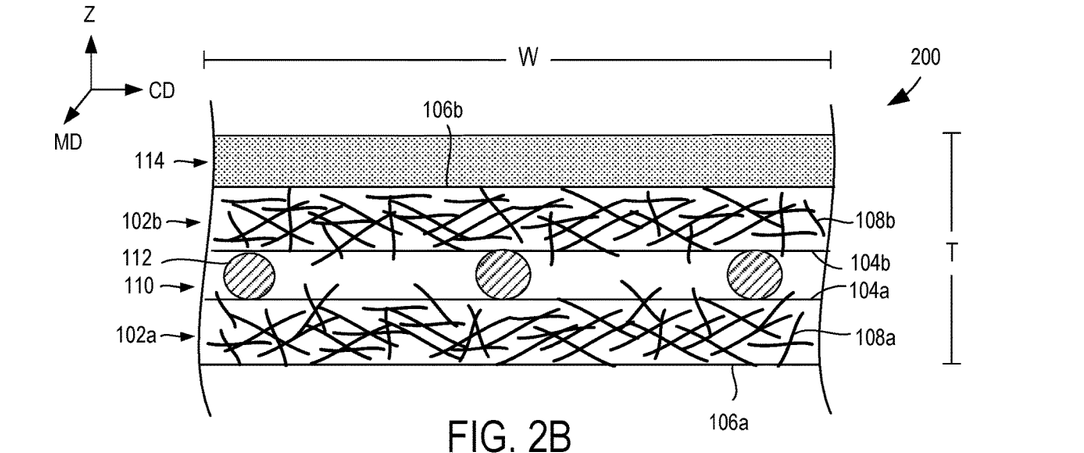
FIG. 2B is a schematic, cross-sectional view of the exemplary fibrous composite of FIG. 2A.
Figure 3A:
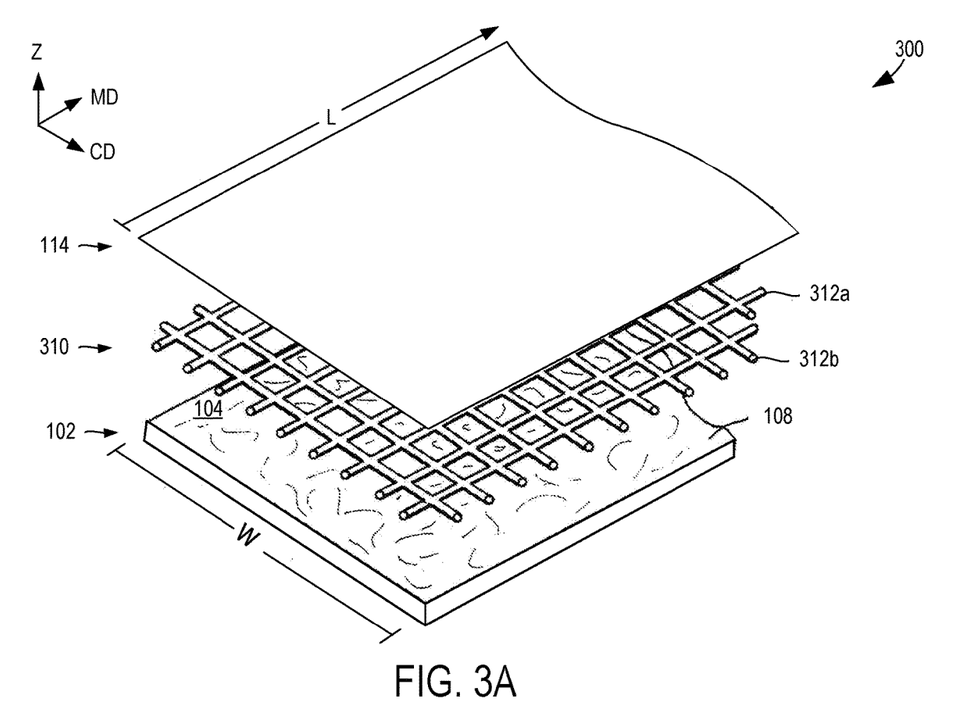
FIG. 3A is a schematic, exploded perspective view of another exemplary fibrous composite according to an embodiment.
Figure 3B:
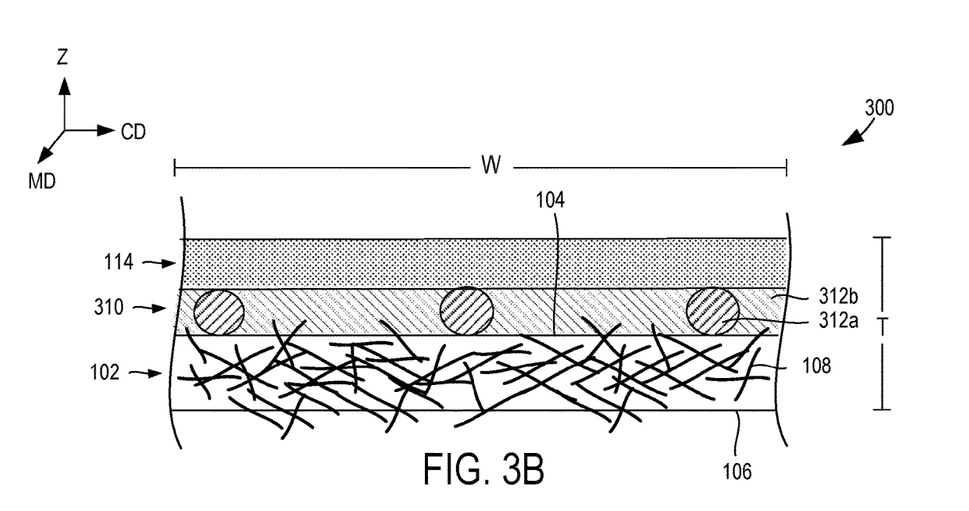
FIG. 3B is a schematic, cross-sectional view of the exemplary fibrous composite of FIG. 3A.
Figure 4A:
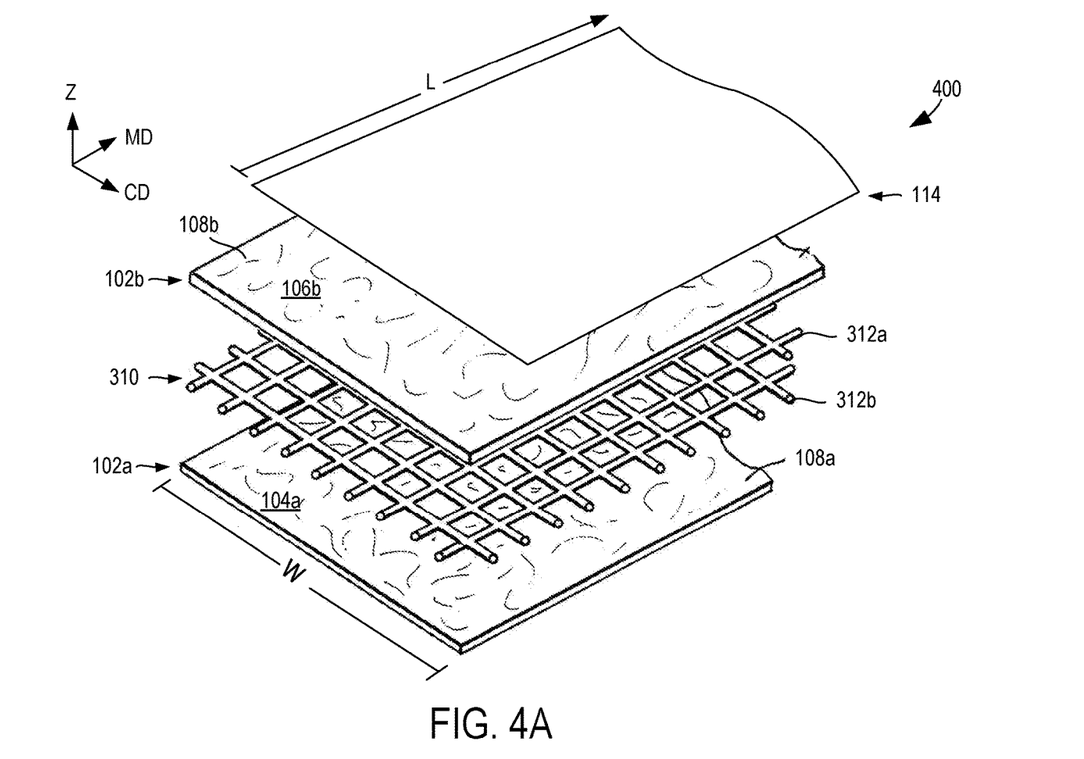
FIG. 4A is a schematic, exploded perspective view of another exemplary fibrous composite according to an embodiment.
Figure 4B:
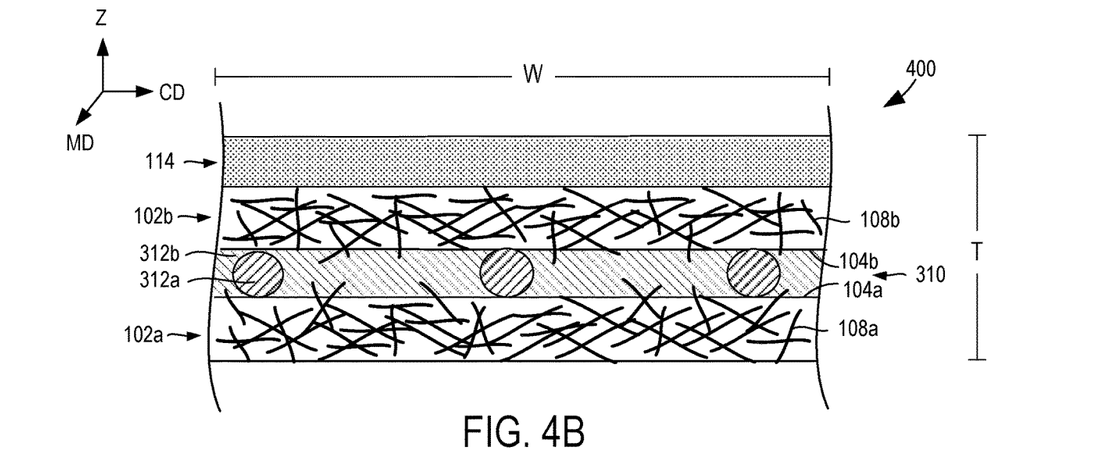
FIG. 4B is a schematic, cross-sectional view of the exemplary fibrous composite of FIG. 4A.

FIGS. 2A and 2B depict a variation of the composite 100 of FIGS. 1A and 1B. In the exemplary embodiment of FIGS. 2A and 2B, the composite 200 generally includes a first carded web layer 102a (i.e., a layer of carded fibers) having a pair of opposed sides or surfaces 104a, 106a (e.g., a first, inner side or surface 104a and a second, outer side or surface 106a), and a second carded web layer 102b (i.e., a layer of carded fibers) having a pair of opposed sides or surfaces 104b, 106b (e.g., a first, inner side or surface 104b and a second, outer side or surface 106b). The carded web layers 102a, 102b may generally be formed from (i.e., may generally comprise) staple fibers 108a, 108b. The composite 200 may further include a layer 110 of (i.e., a plurality of) filament yarns 112 (i.e., a filament yarn layer 110) extending in the machine direction MD between the carded web layers 102a, 102b, such that the filament yarns 112 are in contact with the inner surfaces 104a, 104b of the carded web layers 102a, 102b. As above, the filament yarns 112 may be spaced apart from adjacent filaments along a width W of the carded web layers 102a, 102b. Thus, although the filament yarns do not form a continuous or unitary layer, the term "layer" is used for simplicity and ease of discussion, and not limitation.

The filament yarn layer 110 and the respective carded web layer(s) 102 (FIGS. 1A-1B) or 102a, 102b (FIGS. 2A-2B) layers of the composites 100, 200 may be needlepunched or otherwise joined or interconnected to one another to form a unitary structure. Thus, it will be appreciated that, although the layers are depicted schematically in FIGS. 1A-2B as being discrete layers, the needlepunching of the layers together generally entangles the layers, so that at least some staple fibers 108 or 108a, 108b of the respective carded web layers 102 or 102a, 102b may extend at least partially in the Z direction at least partially into the adjacent layer(s) of the respective composite 100, 200. Further, in some embodiments, at least some filament yarns 112 of the respective filament layers 110 may optionally extend at least partially in the Z direction at least partially into the adjacent layer(s) of the respective composite 100, 200.

The composites 100, 200 have an asymmetrical stretch profile, in that the composites exhibit a greater degree of extensibility in the cross-machine direction CD than in the machine direction MD. Specifically, the inclusion of filament yarns extending only in the machine direction ("warp-only") in the composite imparts MD stability to the composite, while maintaining (i.e., not reducing) CD extensibility. Stated differently, the presence of the warp-only filament yarns has little effect on the CD extensibility, so the CD extensibility of the composite is substantially the same as the CD extensibility of the composite without the warp-only filament yarns. Therefore, the composites 100, 200 may advantageously be formed to have a wide range of CD extensibilities, as needed for a particular application.

Composites 100, 200 may generally have an MD elongation (10 #) of less than about 5%, and a CD elongation (10 #) of greater than about 5%. For example, composites 100, 200 may have an MD elongation (10 #) of from about 0.5% to about 2%, and a CD elongation (10 #) of greater than about 9%, for example, from about 9% to about 14%. The ratio of the CD to MD percent elongation (10 #) for composites 100, 200 may be, for example, at least about 5:1, at least about 10:1, at least about 15:1, at least about 20:1, at least about 22:1, or at least about 25:1.

Composites 100, 200 may generally have an MD elongation (50 #) of less than about 9%, and a CD elongation (50 #) of at least about 12%. For example, composites 100, 200 may have an MD elongation (50 #) of from about 4% to about 8%, and a CD elongation (50 #) of at least about 15%. In one particular example, the CD elongation (50 #) may be at least about 20%, for example, from about 25% to about 45%. The ratio of the CD to MD percent elongation (50 #) for composites 100, 200 may be, for example, at least about 3:1, at least about 5:1, at least about 8:1, or at least about 10:1.

Filament yarns 112 that may be suitable for use in forming fibrous composites 100, 200 may generally have a denier of from about 500 dpf to about 1500 dpf, for example, from about 800 dpf to about 1200 dpf, or for example, about 1000 dpf. The composite may generally include from about 4 count per inch (or ends per inch (EPI)) to about 10 count per inch filament yarns, and in one particular example, may include about 9 count per inch filament yarns.

The filament yarns may be formed from a synthetic polymer, for example, polyester. One example of a polyester filament yarn that may be suitable for use in a fibrous composite according to the disclosure is available from Warp Development Corporation (Monroe, N.C.) as product no. 504e. However, other suitable yarns may be used.

Still viewing FIGS. 1A-2B, the composite 100, 200 may optionally include a polymeric layer 114. In the composite 100 of FIGS. 1A-1B, the polymeric layer 114 is positioned in a facing relationship with the filament layer 110. However, in an alternate embodiment (not shown), the polymeric layer 114 may be positioned in a facing relationship with the carded web layer 102 (e.g., such that the polymeric layer 114 is in contact with the outer side 106 of the carded web layer 102). In the composite 200 of FIGS. 2A-2B, the polymeric layer 114 is positioned in a facing relationship with the second carded web layer 102b (i.e., such that the polymeric layer 114 is in contact with the outer side 106b of the second carded web layer 102b). The various other layers of each composite 100, 200 may likewise each be in a substantially facing, contacting relationship with one or more adjacent layers, as shown in FIGS. 1A-2B. The use of such a polymeric layer 114 may be suitable, for example, when the composite 100, 200 is intended for use in forming a pipe liner. The polymeric layer 114 may be omitted for other applications, if not needed.

FIGS. 3A-3B and 4A-4B schematically illustrate respective variations of the fibrous composites 100, 200 shown in FIGS. 1A-1B and 2A-2B. The composites 300, 400 of FIGS. 3A-3B and 4A-4B include features that are similar to composites 100, 200 of FIGS. 1A-1B and 2A-2B, except for variations noted and variations that will be understood by those of skill in the art. For simplicity, and not limitation, the reference numerals of similar features are noted with the same reference numerals and the details of such features are not repeated here for sake of brevity.

More particularly, the composites 300, 400 of FIGS. 3A-3B and 4A-4B are similar to the composites 100, 200 of FIGS. 1A-1B and 2A-2B, except that the composites 300, 400 include an extensible scrim layer 310 (e.g. a CD-extensible scrim layer) instead of the filament yarn layer 110. As will be understood by those of skill in the art, scrim materials generally include a plurality of warp yarns 312a and weft yarns 312b that are positioned at substantially right angles to one another. The warp and weft yarns 312a, 312b are interwoven or bonded at their points of intersection, such that the arrangement of yarns generally defines and surrounds a plurality of rectangular or square lattice-like openings.

The composites 300, 400 have an asymmetrical stretch profile, in that the composites exhibit a greater degree of extensibility in the cross-machine direction CD than in the machine direction MD. Specifically, the use of a scrim layer 310 including extensible CD yarns (i.e., weft yarns 312b) in combination with substantially non-extensible MD yarns (e.g., warp yarns 312a) imparts a degree of extensibility to the composite 300, 400 in the cross-machine direction CD, while rendering the composite 300, 400 substantially inextensible in the machine direction MD.

In one exemplary embodiment, the weft yarns 312b may be textured filament yarns (i.e., continuous filament yarns that have been processed to introduce durable crimps, coils, loops or other fine distortions along the lengths of the filaments), and the warp yarns 312a may be plain filament yarns (i.e., non-textured yarns). The scrim 310 may be a weft-inserted knit scrim or any other suitable type of scrim.

In such an embodiment, the composites 300, 400 (including the textured filament yarns 312b and the plain filament yarns 312a) may have an MD elongation (10 #) of less than about 5%, and a CD elongation (10 #) of at least about 5%. For example, composites 300, 400 may have an MD elongation (10 #) of from about 0.5% to about 2%, and a CD elongation (10 #) of from about 5% to about 10%, for example, from about 7% to about 8%. The ratio of the CD to MD percent elongation (10 #) for composites 300, 400 may be, for example, at least about 4:1, at least about 5:1, at least about 6:1, or at least about 7:1.

The composites 300, 400 (including the textured filament yarns and the plain filament yarns) may have an MD elongation (50 #) of less than about 5%, and a CD elongation (50 #) of at least about 12%, for example, at least about 20%.

For example, the composites 300, 400 may have an MD elongation (50 #) of from about 3% to about 5%, and a CD elongation (50 #) of from about 20% to about 30%. The ratio of the CD to MD percent elongation (50 #) for composites 100, 200 may be, for example, at least about 4:1, at least about 5:1, at least about 6:1, or at least about 7:1.

Plain filament yarns 312a that may be suitable for use with the exemplary composites 300, 400 may generally have a denier of from about 500 dpf to about 1500 dpf, for example, from about 750 dpf to about 1250 dpf, for example, about 1000 dpf. Textured filament yarns 312b that may be suitable may generally have a denier of from about 50 dpf to about 200 dpf, for example, from about 125 dpf to about 175 dpf, from about 60 dpf to about 100 dpf, or from about 60 dpf to about 80 dpf. In one particular example, the plain filament yarns 312a may have a denier of about 1000 and the textured filament yarns 312b may have a denier of about 70 dpf. In another particular example, the plain filament yarns 312a may have a denier of about 1000 and the textured filament yarns 312b may have a denier of about 150 dpf. However, other deniers and ranges thereof may be suitable.

The plain filament yarns 312a may be present in an amount of from about 6 to about 12 count per inch, for example, from about 8 to about 10 count per inch, or for example, about 9 count per inch. The textured filament yarns 312b may be present in an amount of from about 4 to about 15 count per inch, for example, from about 4 to about 10 count per inch, from about 4 to about 8 count per inch, or about 5 count per inch. In one particular example, the plain filament yarns 312a may be present in an amount of about 9 count per inch, and the textured filament yarns 312b may be present in an amount of about 10 count per inch. In another particular example, the plain filament yarns 312a may be present in an amount of about 9 count per inch, and the textured filament yarns 312b may be present in an amount of about 5 count per inch. However, other configurations of yarns 312a, 312b may be suitable.

The scrim 310 may generally be formed from a synthetic polymer, for example, polyester. Examples of scrim materials including textured filament yarns and plain filament yarns that may be suitable for use in a fibrous composite according to the disclosure include, but are not limited to, scrim nos. S58897, S58897A, S58897B, and S5887C, available from Highland Industries (Kernersville, N.C.). However, countless other possibilities are contemplated.

In another exemplary embodiment, the weft yarns 312b may be elastic yarns (e.g., elastane or other highly extensible) yarns, and the warp yarns 312a may be spun yarns or plain filament yarns.

In such an embodiment, the composites 300, 400 (including elastic yarns 312b and spun yarns/plain filament yarns 312a) may have an MD elongation (10 #) of less than about 5%, and a CD elongation (10 #) of at least about 5%. For example, composites 300, 400 may have an MD elongation (10 #) of from about 0.5% to about 3%, and a CD elongation (10 #) of from about 5% to about 15%, for example, from about 8% to about 12%, or for example, from about 9% to about 10%. The ratio of the CD to MD percent elongation (10 #) for composites 300, 400 may be, for example, at least about 4:1, at least about 5:1, at least about 6:1, at least about 8:1, at least about 10:1, or at least about 11:1.

The composites 300, 400 (including elastic yarns 312b and spun yarns/plain filament yarns 312a) may have an MD elongation (50 #) of less than about 5%, and a CD elongation (50 #) of at least about 20%. For example, composites 300, 400 may have an MD elongation (50 #) of from about 3% to about 5%, and a CD elongation (50 #) of from about 20% to about 35%. The ratio of the CD to MD percent elongation (50 #) for composites 300, 400 may be, for example, at least about 4:1, at least about 5:1, at least about 6:1, at least about 10:1, or at least about 15:1.

Elastic yarns 312*b* that may be suitable may generally have a size of from about 150 to 200 denier, for example, about 180 denier. Plain filament yarns 312*a* that may be suitable may generally have a size of from about 300 to about 1200 denier, for example, from about 500 to about 1000 denier. In one particular example, the elastic yarns 312*b* may have a denier of about 180 and the spun yarns 312*a* may have a denier of about 500 denier. In another particular example, the elastic yarns 312*b* may have a denier of about 180 and the plain filament yarns may have a denier of about 1000 denier. However, other deniers and ranges thereof may be suitable.

The elastic yarns 312*b* may be present in an amount of from about 5 to about 10 count per inch, for example, from about 6 to about 9 count per inch, for example, about 7 or about 8 count per inch. The spun yarns or plain filament yarns 312*a* may be present in an amount of from about 10 to about 30 count per inch, for example, from about 15 to about 20 count per inch, for example, about 18 count per inch. In one particular example, the spun yarns or plain filament yarns 312*a* may be present in an amount of about 18 count per inch, and the elastic yarns 312*b* may be present in an amount of about 8 count per inch. In another particular example, the spun yarns or plain filament yarns 312*a* may be present in an amount of about 17.8 count per inch, and the elastic yarns 312*b* may be present in an amount of about 7.6 count per inch.

The scrim 310 may be formed from a synthetic polymer, for example, polyester. One example of a scrim including elastic yarns and spun yarns that may be suitable for use in a fibrous composite is woven scrim T0927, available from Wilkie China. An example of a scrim including elastic yarns and plain filament yarns that may be suitable for use in a fibrous composite is woven scrim T0931, available from Wilkie China. Numerous other possibilities are contemplated.

The various other properties of the individual layers of the fibrous composites, and of the fibrous composites themselves, may vary depending on the needs of each application.

For example, fibrous composites according to the present disclosure (e.g., fibrous composite 100, 200, 300, 400 and others contemplated hereby), may generally have a basis weight of from about 5 osy to about 35 osy. For instance, in each of various examples, the fibrous composite may have a basis weight of from about 8 osy to about 25 osy, from about 10 osy to about 22 osy, from about 10 osy to about 22 osy, or from about 15 osy to about 20 osy. In one particular example, the fibrous composite may have a basis weight of about 19 osy. However, other ranges and basis weights are contemplated.

Where the fibrous composite includes only one carded web layer (e.g., as with composites 100, 300 of FIGS. 1A-1B and FIGS. 3A-3B), the basis weight of the carded web layer (e.g., carded web layer 102, including one or more plies) may be from about 5 to about 35 osy, for example, about 7 to about 25 osy, for example, from about 9 osy to about 20 osy. If the one carded web layer includes more than one ply of carded web layers, the basis weight of each ply may be divided equally or unequally. Where the fibrous composite includes a plurality of carded web layers (e.g., as with composites 200, 400 of FIGS. 2A-2B and FIGS. 4A-4B), the basis weight of each carded web layer (e.g., carded web layers 102*a*, 102*b*) may be from about 2 to about 18 osy, for example, about 3 to about 12 osy, for example, from about 4 osy to about 10 osy. The carded web layers (e.g., carded web layers 102*a*, 102*b*) may have the same basis weight, or may differ in basis weight. While various examples are provided, it will be understood that other basis weights (and/or ranges thereof) may be used, as desired.

In the various embodiments described herein (e.g., fibrous composite 100, 200, 300, 400) and others contemplated hereby, the staple fibers (e.g., staple fibers 108, 108*a*, 108*b*) used to form the carded web layer(s) may be formed from (i.e., comprise or include) any natural or synthetic material, for example, polyethylene terephthalate, polypropylene, nylon, or any combination thereof.

The staple fibers may have any suitable dimensions. Additionally, staple fibers having varying dimensions may be used. For example, the staple fibers may have a diameter of from about 2 microns to about 52 microns, for example, from about 15 microns to about 45 microns, for example, from about 20 microns to about 40 microns. The staple fibers may have a length of from about 1 inches to about 6 inches, for example, from about 2 to about 5 inches, for example, about 1.5 inches, or about 3 inches. However, countless other possibilities are contemplated.

The staple fibers may also have any suitable denier. The staple fibers may generally have a denier of from about 0.7 dpf to about 25 dpf, for example, from about 0.8 dpf to about 15 dpf, for example, from about 0.9 dpf to about 10 dpf, or any other suitable denier or range of deniers.

Additionally, staple fibers having varying deniers may be used. For example, the staple fibers may be (i.e., comprise or include) a mixture or blend of staple fibers including a first plurality of staple fibers having a first denier or range of deniers, and a second plurality of staple fibers having a second denier or range of deniers, and optionally, a third, fourth, fifth, etc. plurality of staple fibers having a third, fourth, fifth, etc. denier or range of deniers. Several examples of staple fiber compositions follow. However, it will be appreciated that countless other compositions may be used.

In one example, the staple fibers may be a mixture or blend of a first plurality of staple fibers having a denier of from about 1 dpf to about 6 dpf, and a second plurality of staple fibers having a denier of from about 2 dpf to about 4 dpf. In another example, the staple fibers may be a mixture or blend of staple fibers having a denier of from about 1 dpf to about 4 dpf, and staple fibers having a denier of from about 4 dpf to about 8 dpf. In another example, the staple fibers may be a mixture or blend of staple fibers having a denier of from about 2 dpf to about 3 dpf, and staple fibers having a denier of from about 5 dpf to about 7 dpf. In still another example, the staple fibers may be a mixture or blend of staple fibers having a denier of about 2.25 dpf, and staple fibers having a denier of about 6 dpf. In each of such examples, the first plurality of staple fibers and the second plurality of staple fibers may each present in an amount of from about 25 wt % to about 75 wt % of the mixture of staple fibers, or from about 40 wt % to about 60 wt % of the mixture of staple fibers, for example, about 50 wt % of the mixture of staple fibers.

In still another example, the staple fibers may be a mixture or blend of a first plurality of staple fibers having a denier of from about 0.7 dpf to about 6 dpf and a second plurality of staple fibers having a denier of from about 10 dpf to about 25 dpf. In yet another example, the staple fibers may be a mixture or blend of staple fibers having a denier of from about 1 dpf to about 4 dpf, and staple fibers having a denier of from about 15 dpf. In each of such examples, the blend may include from about 60 wt % to about 90 wt % of the first plurality of staple fibers and from about 10 wt % to about 40 wt % of the second plurality of staple fibers, for example, from about 65 wt % to about 80 wt % of the first plurality of staple fibers and from about 20 wt % to about 35 wt % of the second plurality of staple fibers, for example, about 75 wt % of the first plurality of staple fibers and about 25 wt % of the second plurality of staple fibers.

In a still further example, the staple fibers may be a mixture or blend of a first plurality of staple fibers having a denier of from about 0.7 dpf to about 6 dpf, a second plurality of staple fibers having a (different) denier of from about 0.7 dpf to about 6 dpf, and a third plurality of staple fibers having a denier of from about 10 dpf to about 25 dpf, for example, about 15 dpf. The blend of staple fibers may include from about 40 wt % to about 60 wt % of the first plurality of staple fibers, from about 20 wt % to about 40 wt % of the second plurality of staple fibers, and from about 20 wt % to about 40 wt % of the third plurality of staple fibers. In one particular example, blend of staple fibers may include about 50 wt % of the first plurality of staple fibers, about 25 wt % of the second plurality of staple fibers, and about 25 wt % of the third plurality of staple fibers.

In yet another example, the staple fibers may be a mixture or blend of staple fibers having a denier of from about 1 dpf to about 4 dpf, and staple fibers having a denier of from about 15 dpf. In each of such examples, the blend may include from about 60 wt % to about 90 wt % of the first plurality of staple fibers and from about 10 wt % to about 40 wt % of the second plurality of staple fibers, for example, from about 65 wt % to about 80 wt % of the first plurality of staple fibers and from about 20 wt % to about 35 wt % of the second plurality of staple fibers, for example, about 75 wt % of the first plurality of staple fibers and about 25 wt % of the second plurality of staple fibers.

In each of the various embodiments described herein (e.g., fibrous composite 100, 200, 300, 400) and others contemplated hereby, polymeric layer (e.g., layer 114) may generally have a thickness of from about 0.002 inches (2 mil) to about 0.25 inches (25 mil) (e.g., when the polymeric layer is a film layer) or from about 0.008 inches (8 mil) to about 0.25 inches (25 mil) (e.g., when the polymeric layer is an extrusion coating/lamination).

The polymeric layer (e.g., layer 114) may be formed from (i.e., comprise or include) polyvinyl chloride, polyurethane, nylon, polypropylene, or any combination thereof. The polymeric layer may be a coating or a film, and may be incorporated into the fibrous composite using any conventional method or technique including, but not limited to, extrusion coating/extrusion lamination, adhesive lamination, or any other suitable technique.

As stated above, the various composites of the present disclosure may find particular utility for use in making cure-in-place pipe liners. To do so, the composite is generally formed into a tubular structure or sleeve (i.e., with a sealed axial or lengthwise seam) and cut to the appropriate length, as would be understood by those in the art. The tubular structure or sleeve is inserted into the pipe and expanded so that the tubular structure or sleeve is in contact with the inner surface of the pipe. By having an asymmetrical stretch profile, a pipe liner formed from the composite of the present disclosure readily expands in the radial/circumferential direction, while remaining substantially the same length in the axial/lengthwise direction.

Examples

The extensibility of various composites prepared according to the present disclosure was compared with that of a commercially available pipe liner material from Applied Felts Inc. (Martinsville, Va.) (the Control material). In each sample other than the Control material, the carded web layers were formed using a 50/50 mixture of 2.25 dpf and 6 dpf staple fibers. The scrim layer of Samples S1-S4 were scrim nos. S58897, S58897A, S58897B, and S5887C obtained from Highland Industries (Kernersville, N.C.). The scrim layer of Samples W1 and W2 were respective scrim products T0927 (ring-spun) and T0931 (filament) obtained from Wilkie China. The filament yarns of Samples R10, R14, and R18 were obtained from Warp Development Corporation (Monroe, N.C.) under the name 504e.

Percent elongation was measured according to ASTM D5035—11(2015) "Standard Test Method for Breaking Force and Elongation of Textile Fabrics (Strip Method)". The results are presented in Table 1, in which CPI is count per inch, E@10 # and E@50 # are the percent elongations at 10 lb and 50 lb (lb-f/2-in. strip), and RTC is the ratio of CD/MD (sample) to CD/MD (control). All values in Table 1 are approximate, unless otherwise noted.

As will be evident, all of the samples provided significantly more stretch in the cross-machine direction than the control sample. All of the samples also exhibited RTC values greater than 1, indicating that that composite samples exhibited more stretch in the cross-machine direction than in the machine direction.

TABLE 1

| Sample | Description | MD CPI | MD Denier | MD Fiber type | CD CPI | CD Denier | CD Fiber type |
|---|---|---|---|---|---|---|---|
| Control | 8.5 osy Carded web/ 2 osy stretch-resistant scrim/ 8.5 osy Carded web | 9 | 1000 dpf | Polyester filament yarn | 9 | 500 dpf | Polyester filament yarn |
| S1 | 8.5 osy Carded web/ 2 osy Weft-inserted knit scrim/ 8.5 osy Carded web | 9 | 1000 dpf | Polyester filament yarn | 5 | 70 dpf | Textured polyester filament yarn |
| S2 | 8.5 osy Carded web/ 2 osy Weft-inserted knit scrim/ 8.5 osy Carded web | 9 | 1000 dpf | Polyester filament yarn | 10 | 70 dpf | Textured polyester filament yarn |
| S3 | 8.5 osy Carded web/ | 9 | 1000 | Polyester | 5 | 150 | Textured |

TABLE 1-continued

| Sample | | | dpf | filament yarn | dpf | polyester filament yarn |
|---|---|---|---|---|---|---|
| | 2 osy Weft-inserted knit scrim/ 8.5 osy Carded web | | | | | |
| S4 | 8.5 osy Carded web/ 2 osy Weft-inserted knit scrim/ 8.5 osy Carded web | 9 | 1000 dpf | Polyester filament yarn | 10 | 150 dpf | Textured polyester filament yarn |
| W1 | 8.5 osy Carded web/ 2 osy Woven scrim/ 8.5 osy Carded web | 17.8 | 2/500 denier | Polyester spun-yarn | 7.6 | 1/180 denier | Elastic filament yarn |
| W2 | 8.5 osy Carded web/ 2 osy Woven scrim/ 8.5 osy Carded web | 17.8 | 1000 denier | Polyester filament yarn | 7.6 | 1/180 denier | Elastic filament yarn |
| R14 | 6.5 osy Carded web/ 1 osy Warp yarns/ 6.5 osy Carded web | 9 | 1000 dpf | Polyester filament yarn | N/A | N/A | None |
| R18 | 8.5 osy Carded web/ 1 osy Warp yarns/ 8.5 osy Carded web | 9 | 1000 dpf | Polyester filament yarn | N/A | N/A | None |
| R10 | 4.5 osy Carded web/ 1 osy Warp yarns/ 4.5 osy Carded web | 9 | 1000 dpf | Polyester filament yarn | N/A | N/A | None |

| Sample | E@10# MD | E@10# CD | E@10# CD/MD | E@10# RTC | E@50# MD | E@50# CD | E@50# CD/MD | E@50# RTC |
|---|---|---|---|---|---|---|---|---|
| Control | 1.3% | 2.2% | 1.69 | N/A | 4.2% | 11.4% | 2.71 | N/A |
| S1 | 1.2% | 7.7% | 6.42 | 3.79 | 3.9% | 25.4% | 6.51 | 2.40 |
| S2 | 1.1% | 7.4% | 6.73 | 3.98 | 3.8% | 23.8% | 6.26 | 2.31 |
| S3 | 1.2% | 7.4% | 6.17 | 3.64 | 4.3% | 23.0% | 5.35 | 1.97 |
| S4 | 1.1% | 7.8% | 7.09 | 4.19 | 3.6% | 24.9% | 6.92 | 2.55 |
| W1 | 2.2% | 9.4% | 4.26 | 2.52 | 4.4% | 27.5% | 6.32 | 2.33 |
| W2 | 0.9% | 10.4% | 11.30 | 6.68 | 2.0% | 30.0% | 15.38 | 5.67 |
| R14 | 0.6% | 13.4% | 22.33 | 13.20 | 5.0% | 41.3% | 8.26 | 3.04 |
| R18 | 1.8% | 9.4% | 5.22 | 3.09 | 8.1%* | 29.3% | 3.62 | 1.33 |
| R10 | 0.9% | 10.1% | 11.22 | 6.63 | 4.3% | 32.4% | 7.53 | 2.78 |

*It is believed that this value may be artificially high due to difficulties encountered when using the warp-only yarns on lab-scale equipment.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C", and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more", and "at least one" can be used interchangeably herein. Furthermore, references to "one embodiment", "some embodiments", "an embodiment", and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first", "second", "upper", "lower", etc. are used to identify one element from another, and unless otherwise specified are not meant to refer to a particular order or number of elements. All directional references (e.g., "upper", "lower", "upward", "downward", "left", "right", "leftward", "rightward", "top", "bottom", "above", "below", "vertical", "horizontal", "clockwise", and "counterclockwise") are used only for identification purposes to aid the reader's understanding of the various embodiments of the present invention, and do not create limitations, particularly as to the position, orientation, or use of the invention unless specifically set forth in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate", "compute" and variations thereof, as used herein, are used interchangeably and include any type of methodology, process, mathematical operation, or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A fibrous composite comprising:
a first layer comprising a plurality of staple fibers, the first layer having a first dimension extending in a first direction and a second dimension extending in a second direction, the first direction and the second direction being substantially perpendicular to one another; and
a second layer comprising a plurality of filament yarns oriented in the first direction and disposed along the second dimension of the first layer, wherein
the plurality of filament yarns of the second layer and the plurality of staple fibers of the first layer are mechanically entangled with each other,
the plurality of filament yarns do not form a unitary second layer; and
the fibrous composite has a greater degree of extensibility in the second direction than in the first direction; and
a third layer comprising a plurality of staple fibers, wherein the plurality of staple fibers of the third layer are mechanically entangled with the plurality of filament yarns of the second layer and the plurality of staple fibers of the first layer.

2. The fibrous composite of claim 1, wherein
the fibrous composite has an elongation in the first direction of less than about 9% at a load of 10 lb-f/2-in. strip,
an elongation in the second direction of at least about 9% at a load of 10 lb-f/2-in. strip, wherein a ratio of the elongation in the second direction to the elongation in the first direction is at least about 5 to 1.

3. The fibrous composite of claim 1, wherein
the filament yarns have a denier per filament from about 500 dpf to about 1500 dpf.

4. The fibrous composite of claim 1, wherein
the filament yarns are present in an amount of from about 4 count per inch to about 10 count per inch.

5. The fibrous composite of claim 1, wherein the plurality of staple fibers independently comprise
from about 40 wt % to about 60 wt % of staple fibers having a denier per filament from about 0.7 dpf to about 6 dpf, and
from about 40 wt % to about 60 wt % of staple fibers having a denier per filament from about 4 dpf to about 8 dpf.

6. A fibrous composite comprising:
a first layer comprising a plurality of staple fibers, the first layer having a first dimension extending in a first direction and a second dimension extending in a second direction, the first direction and the second direction being substantially perpendicular to one another;
a second layer comprising a first plurality of filament yarns oriented in the first direction and disposed along the second dimension of the first layer, and a second plurality of filament yarns oriented in the second direction and disposed along the first dimension of the first layer; and
a third layer comprising a plurality of staple fibers, wherein
the second layer is disposed between the first layer and the third layer;
the plurality of staple fibers of the first layer are mechanically entangled with the first plurality of filament yarns and the second plurality of filament yarns, and
the fibrous composite has a greater degree of extensibility in the second direction than in the first direction;
the plurality of staple fibers of the third layer are mechanically entangled with the first plurality of filament yarns of the second layer and the plurality of staple fibers of the first layer;
the fibrous composite has an elongation in the first direction of from about 0.5% to about 5% at a load of 10 lb-f/2-in. strip, and
an elongation in the second direction of at least about 5% at a load of 10 lb-f/2-in. strip, wherein a ratio of the elongation in the second direction to the elongation in the first direction is at least about 6 to 1.

7. The fibrous composite of claim 6, wherein
the second layer is an open mesh scrim.

8. The fibrous composite of claim 6, wherein
the first plurality of filament yarns oriented in the first direction comprise plain filament yarns, and the second plurality of filament yarns oriented in the second direction comprise textured filament yarns.

9. The fibrous composite of claim 6, wherein
the first plurality of filament yarns oriented in the first direction have a denier per filament from about 500 dpf to about 1500 dpf, and
the second plurality of filament yarns oriented in the second direction have a denier per filament from about 50 dpf to about 200 dpf.

10. The fibrous composite of claim 6, wherein the plurality of staple fibers independently comprise
from about 40 wt % to about 60 wt % of staple fibers having a denier per filament from about 0.7 dpf to about 6 dpf, and
from about 40 wt % to about 60 wt % of staple fibers having a denier per filament from about 4 dpf to about 8 dpf.

11. The fibrous composite of claim 6, having a basis weight of from about 5 osy to about 35 osy.

12. The fibrous composite of claim 6, wherein
at least one of the staple fibers and yarns independently comprise at least one of polyethylene terephthalate, polypropylene, nylon, homopolymer acrylic and polyacrylonitrile.

13. The fibrous composite of claim 6, further comprising a layer of polymeric material, wherein
the layer of polymeric material comprises a polymer film or an extrusion coating.

14. The fibrous composite of claim 13, wherein
the layer of polymeric material comprises at least one of a polyvinyl chloride, a polyurethane, a nylon, and a polypropylene.

15. The fibrous composite of claim 6, rolled into a tube, wherein
the tube is for being used a pipe liner.

16. A fibrous composite comprising:
a first layer comprising a plurality of staple fibers, the first layer having a first dimension extending in a first direction and a second dimension extending in a second direction, the first direction and the second direction being substantially perpendicular to one another; and
a second layer comprising a first plurality of yarns oriented in the first direction and disposed along the second dimension of the first layer, and a second plurality of yarns oriented in the second direction and disposed along the first dimension of the first layer, wherein
the yarns oriented in the first direction comprise plain filament yarns or spun yarns,
the yarns oriented in the second direction comprise elastic yarns,
the plurality of staple fibers of the first layer are mechanically entangled with
the first plurality of yarns and the second plurality of yarns,
the fibrous composite has a greater degree of extensibility in the second direction than in the first direction,
the fibrous composite has
an elongation in the first direction of from about 0.5% to about 5% at a load of 10 lb-f/2-in. strip, and
an elongation in the second direction of at least about 5% at a load of 10 lb-f/2-in. strip, wherein a ratio of the elongation in the second direction to the elongation in the first direction is at least about 6 to 1.

17. The fibrous composite of claim 16, wherein
the elongation in the first and second directions is measured according to ASTM D5035-11.

18. The fibrous composite of claim 16, further comprising:
a third layer comprising a plurality of staple fibers, wherein
the plurality of staple fibers of the third layer are mechanically entangled with the plurality of yarns of the second layer and the plurality of staple fibers of the first layer; and
the second layer is disposed between the first layer and the third layer.

* * * * *